United States Patent
Totolos et al.

(10) Patent No.: US 9,760,314 B2
(45) Date of Patent: Sep. 12, 2017

(54) METHODS FOR SHARING NVM SSD ACROSS A CLUSTER GROUP AND DEVICES THEREOF

(71) Applicant: NetApp, Inc., Sunnyvale, CA (US)

(72) Inventors: George Totolos, Cranberry Township, PA (US); Steve Miller, Sunnyvale, CA (US); Michael Hordijk, Steamboat Springs, CO (US)

(73) Assignee: NetApp, Inc., Sunnyvale, CA (US)

( * ) Notice: Subject to any disclaimer, the term of this patent is extended or adjusted under 35 U.S.C. 154(b) by 192 days.

(21) Appl. No.: 14/726,137

(22) Filed: May 29, 2015

(65) Prior Publication Data

US 2016/0352831 A1  Dec. 1, 2016

(51) Int. Cl.
| | | |
|---|---|---|
| G06F 15/16 | (2006.01) | |
| G06F 3/06 | (2006.01) | |
| G06F 21/44 | (2013.01) | |
| G06F 21/79 | (2013.01) | |

(52) U.S. Cl.
CPC ............ G06F 3/067 (2013.01); G06F 3/0604 (2013.01); G06F 3/0631 (2013.01); G06F 3/0688 (2013.01); G06F 21/44 (2013.01); G06F 21/79 (2013.01)

(58) Field of Classification Search
CPC ......... G06F 3/0659; G06F 21/44; G06F 21/79
See application file for complete search history.

(56) References Cited

U.S. PATENT DOCUMENTS

| | | |
|---|---|---|
| 6,119,205 A | 9/2000 | Wicki et al. |
| 6,725,337 B1 | 4/2004 | Tan et al. |
| 7,099,955 B1 | 8/2006 | Gregg et al. |
| 7,203,796 B1 | 4/2007 | Muppalaneni et al. |
| 7,610,348 B2 | 10/2009 | Kisley et al. |
| 7,624,156 B1 | 11/2009 | Hefty et al. |
| 8,775,718 B2 | 7/2014 | Kanevsky et al. |
| 9,411,819 B1 * | 8/2016 | Long ................. G06F 17/30209 |

(Continued)

FOREIGN PATENT DOCUMENTS

WO    2006096442 A1    9/2006

OTHER PUBLICATIONS

Advisory Action mailed Aug. 6, 2012 for U.S. Appl. No. 12/239,092, filed Sep. 26, 2008, 3 pages.

(Continued)

*Primary Examiner* — Hieu Hoang

(74) *Attorney, Agent, or Firm* — LeClairRyan, a Professional Corporation

(57) ABSTRACT

A method, non-transitory computer readable medium, and device that assists with sharing non-volatile memory solid state drives across a cluster group includes receiving a request for a block of storage in a non-volatile memory solid state drive in one of the plurality of non-volatile memory disk shelves. Information associated with each of a plurality of solid state drives in the plurality of non-volatile memory disk shelves associated with the received request is obtained. A namespace for each of the plurality of solid state drives in the plurality of non-volatile memory disk shelves using the obtained information is created. The requested block of storage in the non-volatile memory solid state drive associated with one of the created namespace is assigned to the requesting client computing device.

20 Claims, 3 Drawing Sheets

(56) References Cited

U.S. PATENT DOCUMENTS

| | | | |
|---|---|---|---|
| 2006/0236063 | A1 | 10/2006 | Hausauer et al. |
| 2006/0248088 | A1 | 11/2006 | Kazar et al. |
| 2007/0078940 | A1 | 4/2007 | Fineberg et al. |
| 2007/0162641 | A1 | 7/2007 | Oztaskin et al. |
| 2007/0282967 | A1 | 12/2007 | Fineberg et al. |
| 2007/0288921 | A1 | 12/2007 | King et al. |
| 2007/0300008 | A1 | 12/2007 | Rogers et al. |
| 2008/0148281 | A1 | 6/2008 | Magro et al. |
| 2008/0183882 | A1 | 7/2008 | Flynn et al. |
| 2009/0198885 | A1 | 8/2009 | Manoj |
| 2015/0319237 | A1* | 11/2015 | Hussain ............ G06F 3/065 709/217 |
| 2016/0162202 | A1* | 6/2016 | Singhai ............ G06F 3/0613 711/103 |
| 2016/0292100 | A1* | 10/2016 | Olcay ............ G06F 13/28 |

OTHER PUBLICATIONS

Advisory Action mailed Aug. 25, 2011 for U.S. Appl. No. 12/165,831, filed Jul. 1, 2006, 4 pages.
Closson K., http//kevinclosson.wordpress.com/Two Terabytes of Flash Solid State Disk Anyone?, Published Sep. 17, 2007, 3 pages.
Ellard D., et al., "DISP: Practical, Efficient, Secure and Fault-Tolerant Distributed Data Storage," ACM Transactions on Storage, URL: http://doi.acm.org/10.1145/1044956.1044960, Feb. 2005, Dec. 2004, vol. 1 (1), pp. 71-94.
EMC Press Release, "EMC2 Where Information Lives, EMC in Major Storage Performance Breakthrough; First with Enterprise-Ready Solid State Flash Drive Technology," http://www.prnewswire.com/mnr/emc,/31368, Webcast: DavidDonatelli Discusses EMC's Latest Storage Innovation, Jan. 14, 2008, 3 pages.
EMC2, "EMC Symmetrix DMX Series," Data Sheet C1005.11, EMC Corporation, Hopkington MA, Jan. 2008, 8 pages.
Final Office Action mailed Apr. 11, 2012 for U.S. Appl. No. 12/239,092, filed Sep. 26, 2008, 26 pages.
Final Office Action mailed Apr. 15, 2015 for U.S. Appl. No. 12/239,092, filed Sep. 26, 2008, 32 pages.
Final Office Action mailed Feb. 11, 2013 for U.S. Appl. No. 12/165,831, filed Jul. 1, 2008, 15 pages.
Final Office Action mailed Jun. 8, 2011 for U.S. Appl. No. 12/165,831, filed Jul. 1, 2008, 12 pages.
Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.
International Preliminary Report on Patentability for Application No. PCT/US2009/044908 mailed on Nov. 23, 2010, 5 pages.
International Search Report for Application No. PCT/US2009/044908 mailed on Dec. 24, 2009, 3 pages.
International Search Report for Application No. PCT/US2009/058256 mailed on May 3, 2010, 3 pages.
Non-Final Office Action mailed Aug. 16, 2012 for U.S. Appl. No. 12/165,831, filed Jul. 1, 2008, 11 pages.
Non-Final Office Action mailed Dec. 3, 2014 for U.S. Appl. No. 12/239,092, filed Sep. 26, 2008, 30 pages.
Non-Final Office Action mailed Mar. 2, 2011 for U.S. Appl. No. 12/165,831, filed Jul. 1, 2008, 10 pages.
Non-Final Office Action mailed Nov. 21, 2011 for U.S. Appl. No. 12/239,092, filed Sep. 26, 2008, 24 pages.
Notice of Allowance mailed Feb. 28, 2014 for U.S. Appl. No. 12/165,831, filed Jul. 1, 2008, 9 pages.
Rabin T., et al., "Verifiable Secret Sharing and Multiparty Protocols with Honest Majority," In Proceedings of the Twenty-First Annual ACM Symposium on theory of Computing, Seattle, Washington, United States, D. S. Johnson, Ed. STOC '89, URL: http://doi.acm.org/10.1145/73007, 1989, 13 pages.
RamSan-500 Details, Texas Memory Systems—Products—RamSan—500 Solid State Disk, www.superssd.com/products/ramsan-500, Apr. 15, 2008, 2 pages.
SystemFabricMem, www.systemfabricworks.com/fabricmem.htm:, Apr. 30, 2008, 3 pages.
U.S. Appl. No. 12/165,831, filed Jul. 1, 2008, 60 pages.
U.S. Appl. No. 12/239,092, filed Sep. 26, 2008, 65 pages.
Written Opinion for Application No. PCT/US2009/058256 mailed on May 3, 2010, 4 pages.
Written Opinion for Application No. PCT/US2009/044908 mailed on Dec. 24, 2009, 4 pages.

* cited by examiner

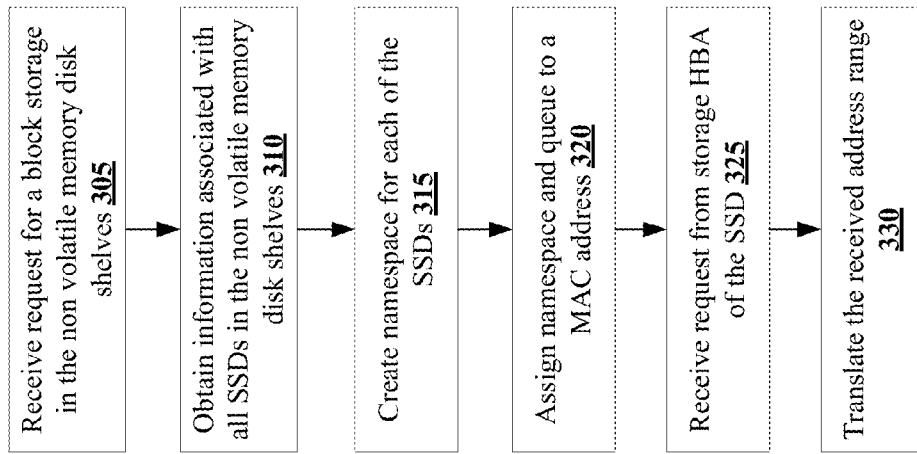

METHODS FOR SHARING NVM SSD ACROSS A CLUSTER GROUP AND DEVICES THEREOF

FIELD

This technology generally relates to data storage management and, more particularly, methods for sharing non-volatile memory solid state drives across a cluster group and devices thereof.

BACKGROUND

Traditional storage systems include two filers connected together as a High Availability (HA) pair. This HA pair would share an array of disk drives which are generally hard disk drives (HDD) in an active-passive manner. With prior technologies, each drive is owned by one filer for as long as the filer is operating properly. However, if one of these filers should experience a fault event, the partner filer of the failed filer would take ownership of the abandoned drives while the failed filer is recovered. Additionally, the performance of the HA pair was typically limited by the performance of the HDD. By way of example, a typical high-performance HDD would be capable of 300 Random Read I/Os per Second (IOPS). So even with an array of 500 HDDs, the HA pair would only be capable of 15,000 Random Read OPS.

With the introduction of NVMe Solid State Drives (SSD), the performance of a single drive has increased to about 1 Million Random Read IOPS. The performance capabilities of just one shelf of 24 SSDs are enough to satisfy 200 filers. However, the challenge with NVMe SSDs is that they are based on the PCIe standard. The PCIe standard provides all the features needed for low latency and high throughput. Unfortunately, the PCIe interface is meant to be embedded in a system for lightly switched, directly connected links that provide tight interaction between system and device. In other words, the characteristics of the protocol that provide low latency also make it difficult to share devices across multiple filers.

SUMMARY

A method for sharing non-volatile memory solid state drives across a cluster group, includes receiving, by a storage management computing device, a request for a block of storage in a non-volatile memory solid state drive in one of the plurality of non-volatile memory disk shelves. Information associated with each of a plurality of solid state drives in the plurality of non-volatile memory disk shelves associated with the received request is obtained by the storage management computing device. A namespace for each of the plurality of solid state drives in the plurality of non-volatile memory disk shelves using the obtained information is created by the storage management computing device. The requested block of storage in the non-volatile memory solid state drive associated with one of the created namespace is assigned to the requesting client computing device by the storage management computing device.

A non-transitory computer readable medium having stored thereon instructions for sharing non-volatile memory solid state drives across a cluster group comprising executable code which when executed by a processor, causes the processor to perform steps includes receiving a request for a block of storage in a non-volatile memory solid state drive in one of the plurality of non-volatile memory disk shelves. Information associated with each of a plurality of solid state drives in the plurality of non-volatile memory disk shelves associated with the received request is obtained. A namespace for each of the plurality of solid state drives in the plurality of non-volatile memory disk shelves using the obtained information is created. The requested block of storage in the non-volatile memory solid state drive associated with one of the created namespace is assigned to the requesting client computing device.

A storage management computing device includes a processor and a memory coupled to the processor which is configured to be capable of executing programmed instructions comprising and stored in the memory to receive a request for a block of storage in a non-volatile memory solid state drive in one of the plurality of non-volatile memory disk shelves. Information associated with each of a plurality of solid state drives in the plurality of non-volatile memory disk shelves associated with the received request is obtained. A namespace for each of the plurality of solid state drives in the plurality of non-volatile memory disk shelves using the obtained information is created. The requested block of storage in the non-volatile memory solid state drive associated with one of the created namespace is assigned to the requesting client computing device.

This technology provides a number of advantages including providing methods, non-transitory computer readable medium and devices for more effectively and efficiently sharing non-volatile memory solid state drives across a cluster group. Additionally, this technology provides better performance over prior technologies as by providing nearly direct access to the storage resources including non-volatile memory solid state drives across a cluster group.

BRIEF DESCRIPTION OF THE DRAWINGS

FIG. 3 is a flow chart of an example of a method for sharing non-volatile memory solid state drives across a cluster group.

DETAILED DESCRIPTION

Figure 1:
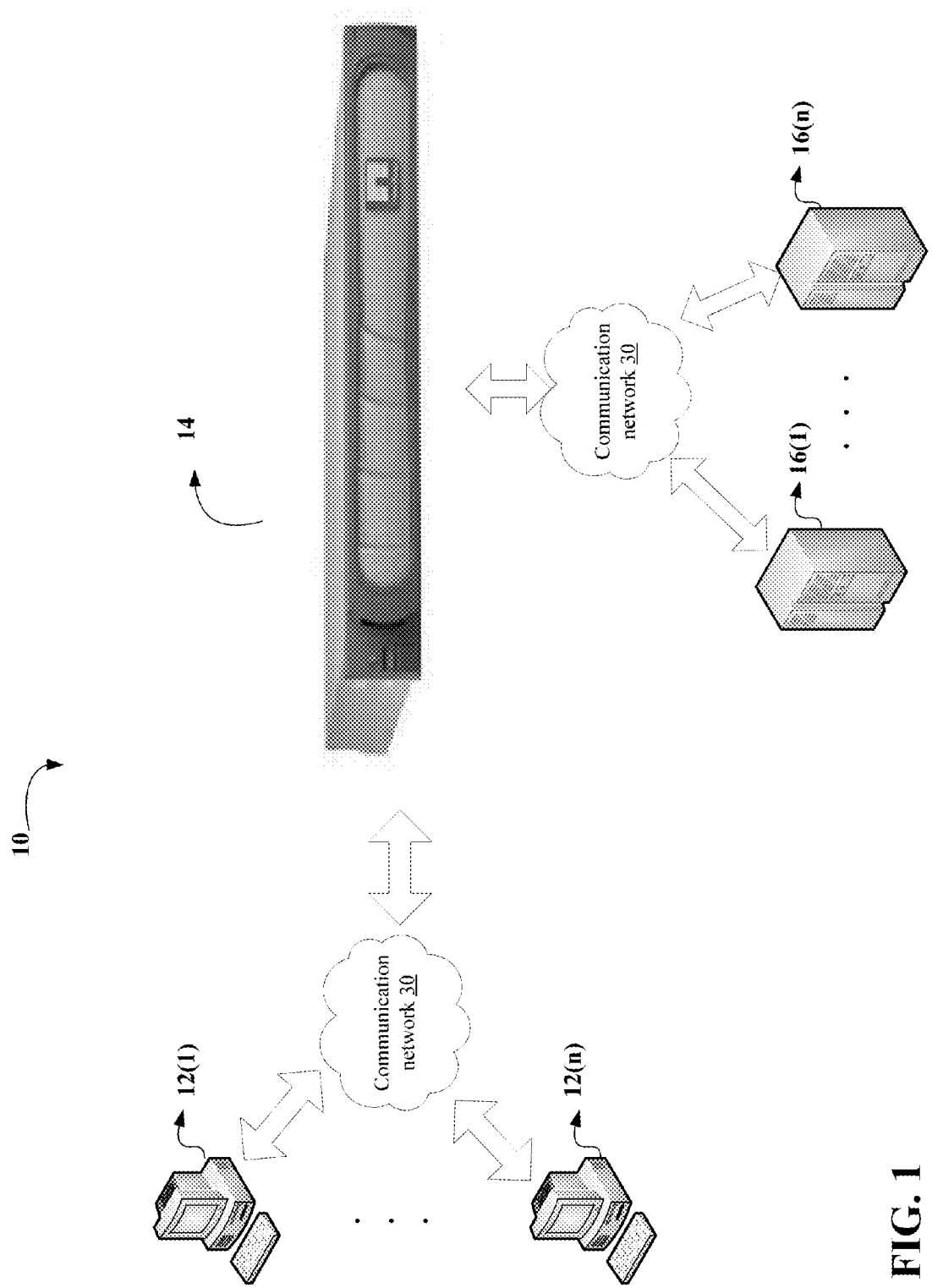
FIG. 1 is a block diagram of an environment with an exemplary storage management computing device.

An environment 10 with a plurality of client computing devices 12(1)-12(n), an exemplary storage management computing device 14, a plurality of non-volatile memory disk shelves 16(1)-16(n) is illustrated in FIG. 1. In this particular example, the environment 10 in FIG. 1 includes the plurality of client computing devices 12(1)-12(n), the storage management computing device 14 and a plurality of non-volatile memory disk shelves 16(1)-16(n) coupled via one or more communication networks 30, although the environment could include other types and numbers of systems, devices, components, and/or other elements. In this example, the method for sharing non-volatile memory solid state drives across a cluster group is executed by the storage management computing device 14 although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable medium and devices for effective sharing of non-volatile memory solid state drives across a cluster group.

Figure 2:
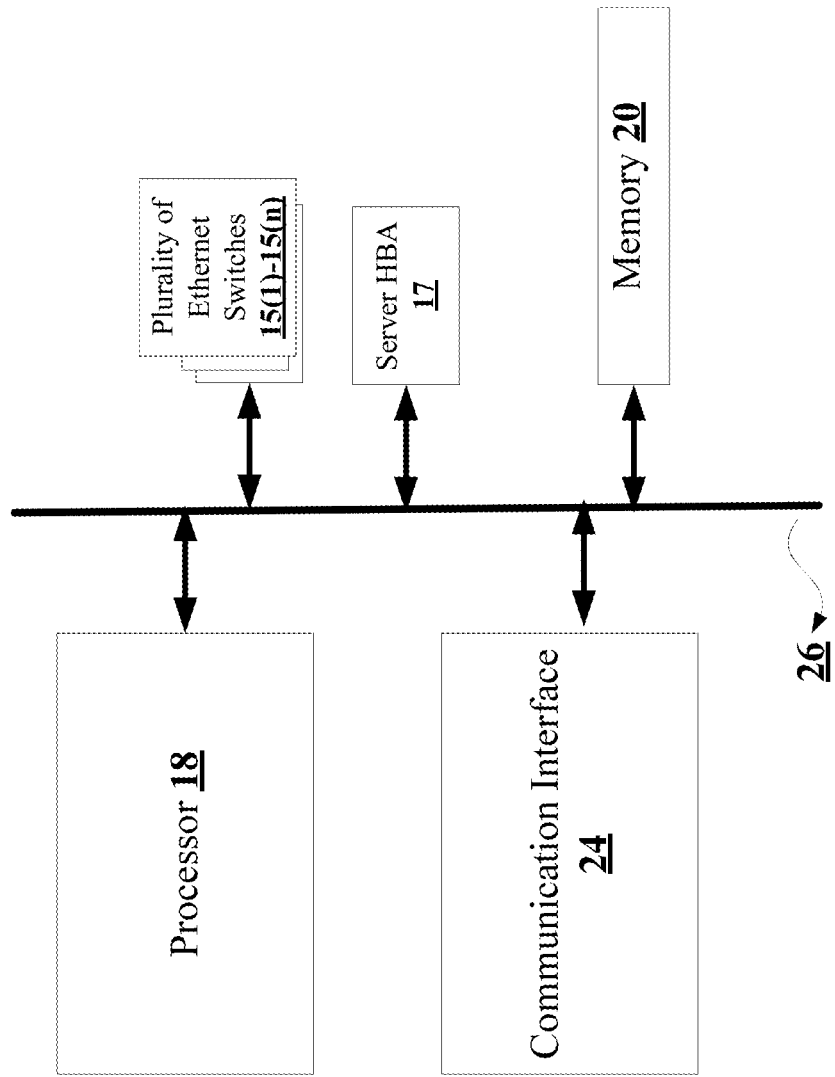
FIG. 2 is a block diagram of the exemplary storage management computing device shown in FIG. 1.

Referring to FIG. 2, in this example the storage management computing device 14 includes a processor 18, a memory 20, a plurality of Ethernet switches 15(1)-15(n), an Ethernet Server Host Bus Adapter (server HBA) 17 and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for sharing of non-volatile memory solid state drives across a cluster group as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

Each of the plurality of Ethernet switches 15(1)-15(n) in the storage management computing device 14 assists the storage management computing device to communicate with the plurality of non-volatile memory disk shelves 16(1)-16(n), although the plurality of Ethernet switches 15(1)-15(n) can assists with communicating with other devices within the environment 10.

The server HBA 17 is a component that is configured to bridge the NVMe protocol from the plurality of client computing devices 12(1)-12(n) to Ethernet and vice-versa. Additionally in this example, the server HBA 17 provides direct memory access between the plurality of non-volatile memory disk shelves 16(1)-16(n) and the memory 20 of the storage management computing device 14.

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of non-volatile memory disk shelves 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 to request block access storage in the plurality of non-volatile memory disk shelves 16(1)-16(n), although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of non-volatile memory disk shelves 16(1)-16(n) via the communication network 30.

Each of the plurality of non-volatile memory disk shelves 16(1)-16(n) includes a central processing unit (CPU) or processor, a plurality of solid state drives (SSD), a plurality of input/output modules (IOM) and an I/O system, which are coupled together by a bus or other link, although other numbers and types of network devices could be used. In this example, each IOM also includes a management CPU, a storage HBA and a PCIe switch, although the IOM can include other types or amounts of components. Each plurality of non-volatile memory disk shelves 16(1)-16(n) assists with storing of files and data from the plurality of client computing devices 12(1)-12(n) or the storage management computing device 14, although the plurality of non-volatile memory disk shelves 16(1)-16(n) can assist with other types of operations. In this example, each plurality of non-volatile memory disk shelves 16(1)-16(n) can be spread across different geographical locations. In another example, all of the plurality of non-volatile memory disk shelves 16(1)-16(n) can be in one geographical location. Various network processing applications, such as CIFS applications, NFS applications, HTTP Web Data storage device applications, and/or FTP applications, may be operating on the plurality of non-volatile memory disk shelves 16(1)-16(n) and transmitting data (e.g., files or web pages) in response to requests from the storage management computing device 14 and the plurality of client computing devices 12(1)-12(n). It is to be understood that the plurality of non-volatile memory disk shelves 16(1)-16(n) may be hardware or software or may represent a system with multiple external resource servers, which may include internal or external networks.

Although the exemplary network environment 10 includes the plurality of client computing devices 12(1)-12(n), the storage management computing device 14, and the plurality of non-volatile memory disk shelves 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for sharing non-volatile memory solid state drives across a cluster group will now be described herein with reference to FIGS. 1-3. The exemplary method beings at step 305 where the storage management computing device 14 receives a request from one of the plurality of client computing devices 12(1)-12(n) for a block storage in one of the plurality of non-volatile memory disk shelves 16(1)-16(n), although the storage management computing device 14 can receive other types or amounts of requests.

In step 310, the storage management computing device 14 obtains information about all the Solid State Drives (SSD) in each plurality of non-volatile memory disk shelves 16(1)-16(n), although the storage management computing device 14 can obtain the information about the SSDs present at other locations. By way of example, the obtained information associated with the SSDs may relate to: memory size of all SSDs in the plurality of non-volatile memory disk shelves 16(1)-16(n); total number of allocated and unallocated SSDs within the plurality of non-volatile memory disk shelves 16(1)-16(n); a unique identification number associated with the SSDs; number, identification and sizes of namespaces supported by all allocated and unallocated SSDs in the plurality of non-volatile memory disk shelves 16(1)-16(n); number and identification of submission or completion queue pairs supported by all allocated and unallocated SSDs in the plurality of non-volatile memory disk shelves 16(1)-16(n); and medium access control address of the storage management computing device attached to each plurality of non-volatile memory disk shelves 16(1)-16(n), although other types and/or amounts of information may be used. In this example, the storage management computing device 14 obtains the information about all the Solid State Drives (SSD) so that the storage management computing device 14 can determine how to allocate the requested block storage.

In step 315, the storage management computing device 14 creates a namespace for each SSDs in the plurality of non-volatile memory disk shelves 16(1)-16(n). In this example, each created namespace includes a plurality of queues, although the namespace can include other types and/or amounts of data structures. In this example, namespace relates to a logical collection of blocks that virtualizes the physical resources used on the drive. Each SSD will report the maximum number of namespaces that is can support. Every block access to one of the plurality of non-volatile memory disk shelves 16(1)-16(n) must identify the namespace to which it belongs. Additionally, in this example, the creation of the namespace is separate from creation of queues. In addition to the creation of namespaces, the storage management computing device 14 can determine which queues may be used to access it. By way of example only, the storage management computing device 14 may choose to use existing queues to access the namespace or to create new queues to access the namespace. That decision is largely based on the capabilities of the drive as some drives support a limited number of queues. Queues can be used to prioritize work and also to allow multiple worker threads or CPU in the plurality of client computing devices 12(1)-12(n) to submit work in parallel and independently of each other.

Next in step 320, the storage management computing device 14 assigns a queue and one of the created namespace to a MAC address of the requesting one of the plurality of client computing devices 12(1)-12(n) to indicate that the namespace is owned by the requesting one of the plurality of client computing devices 12(1)-12(n). In this example, each of the plurality of client computing devices 12(1)-12(n) is associated with one or more MAC address to identify it on the switch. Additionally, the storage management computing device assigns the queues to the MAC address in order to give the plurality of client computing devices 12(1)-12(n) access to one or more namespaces. This MAC address is determined by the storage management computing device 14. Alternatively, the storage management computing device can pre-assign queue to access multiple namespaces, including the newly created namespace, if a new queue is not desired. Once the storage management computing device 14 assigns the queue and the created namespace, the storage management computing device 14 assigns block of storage in the SSDs in one of the plurality of non-volatile memory disk shelves 16(1)-16(n) to the requesting one of the plurality of client computing devices 12(1)-12(n). In this example, the storage HBA in each plurality of non-volatile memory disk shelves 16(1)-16(n) is configured to map a range of its PCIe space to the MAC Address of a Server HBA 17. If any SSD in the plurality of non-volatile memory disk shelves 16(1)-16(n) targets this memory space on the storage HBA, it will forward that request directly to the associated Server HBA 17 in the storage management computing device 14 over Ethernet.

In step 325, the storage management computing device 14 receives a request back from the storage HBA associated with one of the SSD in one of the plurality of non-volatile memory disk shelves 16(1)-16(n) indicating that a memory space that has already been assigned is trying to be reassigned to the requesting one of the plurality of client computing devices 12(1)-12(n). Additionally, in this particular example, the storage management computing device 14 receives an address range between which the block of the storage is being reassigned. In this example, the storage management computing device 14 can expose some amount of memory to the PCIe infrastructure for the plurality of client computing devices 12(1)-12(n).

In step 330, the server HBA 17 in the storage management computing device 14 translates the received address range that comes in from the Storage HBA over Ethernet into an address range that map to DRAM memory 20 on the storage management computing device 14. Once the address has been translated, in order to assure that requests for specific regions of specific devices can be accessed directly, the storage management computing device 14 will give these regions an address range for each of the plurality of client computing devices 12(1)-12(n). The SSDs are designed to access queues and move data using PCIe addresses so these must be programmed properly to assure they are routed to the correct places. An exemplary illustration of the moving the data using PCIe address to the correct places will now be described. First, one of the plurality of client computing devices 12(1)-12(n) adds an NVMe Write Command to the command queue located in its own memory space. Next, the server HBA 17 in the storage management computing device 14 receives a notification indicating that the Write Command is ready. Further, the server HBA 17 in the storage management computing device 14 instructs the storage HBA in one of the plurality of non-volatile memory disk shelves 16(1)-16(n) over Ethernet (communication network 30) that a Write Command is ready. Next, the storage HBA within one of the plurality of non-volatile memory disk shelves 16(1)-16(n) instructs the corresponding SSD (over PCIe) that a Write Command is ready. Furthermore, the SSD fetches the Write Request Descriptor from the memory of the requesting one of the plurality of client computing devices 12(1)-12(n). This request will target a specific PCIe address that maps to the storage HBA within one of the plurality of non-volatile memory disk shelves 16(1)-16(n). Additionally in this example, the storage HBA in one of the plurality of non-volatile memory disk shelves 16(1)-16(n) will map that PCIe Address to a MAC address to send it over Ethernet to the server HBA 17 within the storage management computing device 14. Finally, the Server HBA 17 will map that to a local host memory address.

Now that the SSD has the details of the NVMe Write operation (including the memory address for the data in the Application Server and the block address destination in the drive), the SSD initiates a Write Operation by requesting that data be read from the requesting one of the plurality of client computing devices 12(1)-12(n). This request will target a specific PCIe address that maps to the storage HBA within one of the plurality of non-volatile memory disk shelves 16(1)-16(n). The storage HBA will map that PCIe Address to a MAC address to send it over Ethernet to the server HBA 17. The server HBA 17 will map that to a local host memory address. The server HBA 17 will read the memory from the requesting one of the plurality of client computing devices 12(1)-12(n) and send it to the storage HBA that requested it. The storage HBA moves data to the SSD that originally requested the data.

Accordingly, as illustrated and described by way of the examples herein, this technology provides methods, non-transitory computer readable medium and devices for more effectively and efficiently sharing non-volatile memory solid state drives across a cluster group. Additionally, this technology provides better performance over prior technologies as by providing nearly direct access to the storage resources including non-volatile memory solid state drives across a cluster group.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   receiving, by a computing device, a request for a block of storage in a non-volatile memory solid state drive in one or more of a plurality of non-volatile memory disk shelves;
   obtaining, by the computing device, information associated with a plurality of solid state drives in the plurality of non-volatile memory disk shelves associated with the received request;
   creating, by the computing device, a namespace for each of the plurality of solid state drives in the plurality of non-volatile memory disk shelves using the obtained information;
   assigning, by the computing device, the requested block of storage in the non-volatile memory solid state drive associated with one of the created namespace to a requesting one of one or more client computing devices; and
   reassigning, by the computing device, an address range of the assigned block of storage in the non-volatile memory solid state drive upon receiving a reassignment request indicating that the address range of the assigned block of storage had already been assigned to another of the one or more requesting client computing devices.

2. The method as set forth in claim 1 further comprising assigning, by the computing device, a queue for each of the created namespace.

3. The method as set forth in claim 1 further comprising receiving, by the computing device, a subsequent request and the address range from the assigned non-volatile memory solid state drive.

4. The method as set forth in claim 3 further comprising translating, by the computing device, the received address range to a corresponding address range of a DRAM memory of the storage management computing device.

5. The method as set forth in claim 4 further comprising associating, by the computing device, the address range of the DRAM memory to the one or more requesting client computing device.

6. The method as set forth in claim 1 further comprising instructing, by the computing device, one of the plurality of non-volatile memory disk shelves that a client command is ready.

7. The method as set forth in claim 6 further comprising mapping, by the computing device, a received address mapping to a local host memory address.

8. A non-transitory computer readable medium having stored thereon instructions for performing a method comprising machine executable code which when executed by machine at least one machine, causes the machine to:
   receive a request for a block of storage in a non-volatile memory solid state drive in one or more of a plurality of non-volatile memory disk shelves;
   obtain information associated with a plurality of solid state drives in the plurality of non-volatile memory disk shelves associated with the received request;
   create a namespace for each of the plurality of solid state drives in the plurality of non-volatile memory disk shelves using the obtained information;
   assign the requested block of storage in the non-volatile memory solid state drive associated with one of the created namespace to a requesting one of one or more client computing devices; and
   reassign an address range of the assigned block of storage in the non-volatile memory solid state drive upon receiving a reassignment request indicating that the address range of the assigned block of storage had already been assigned to another of the one or more requesting client computing devices.

9. The medium as set forth in claim 8 further comprising assign a queue for each of the created namespace.

10. The medium as set forth in claim 8 further comprising receive a subsequent request and the address range from the assigned non-volatile memory solid state drive.

11. The medium as set forth in claim 10 further comprising translate the received address range to a corresponding address range of a DRAM memory of a storage management computing device.

12. The medium as set forth in claim 10 further comprising associating the address range of the DRAM memory to the one or more requesting client computing device.

13. The medium as set forth in claim 8 further comprising instructing one of the plurality of non-volatile memory disk shelves that a client command is ready.

14. The medium as set forth in claim 13 further comprising mapping a received address mapping to a local host memory address.

15. A computing device comprising:
a memory containing machine readable medium comprising machine executable code having stored thereon instructions for performing a method of sharing non-volatile memory solid state drives across a cluster group;
a processor coupled to the memory, the processor configured to execute the machine executable code to cause the processor to:
receive a request for a block of storage in a non-volatile memory solid state drive in one or more of a plurality of non-volatile memory disk shelves;
obtain information associated with a plurality of solid state drives in the plurality of non-volatile memory disk shelves associated with the received request;
create a namespace for each of the plurality of solid state drives in the plurality of non-volatile memory disk shelves using the obtained information;
assign the requested block of storage in the non-volatile memory solid state drive associated with one of the created namespace to a requesting one of one or more client computing devices; and
reassign an address range of the assigned block of storage in the non-volatile memory solid state drive upon receiving a reassignment request indicating that the address range of the assigned block of storage had already been assigned to another of the one or more requesting client computing devices.

16. The device as set forth in claim 15 wherein the processor coupled to the memory is further configured to execute the machine executable code to cause the processor to: assign a queue for each of the created namespace.

17. The device as set forth in claim 15 wherein the processor coupled to the memory is further configured to execute the machine executable code to cause the processor to: receive a subsequent request and the address range from the assigned non-volatile memory solid state drive.

18. The device as set forth in claim 17 wherein the processor coupled to the memory is further configured to execute the machine executable code to cause the processor to: translate the received address range to a corresponding address range of a DRAM memory of a storage management computing device.

19. The device as set forth in claim 18 further comprising associating the address range of the DRAM memory to the one or more requesting client computing device.

20. The device as set forth in claim 15 further comprising instructing one of the plurality of non-volatile memory disk shelves that a client command is ready.

\* \* \* \* \*